United States Patent Office 2,963,348
Patented Dec. 6, 1960

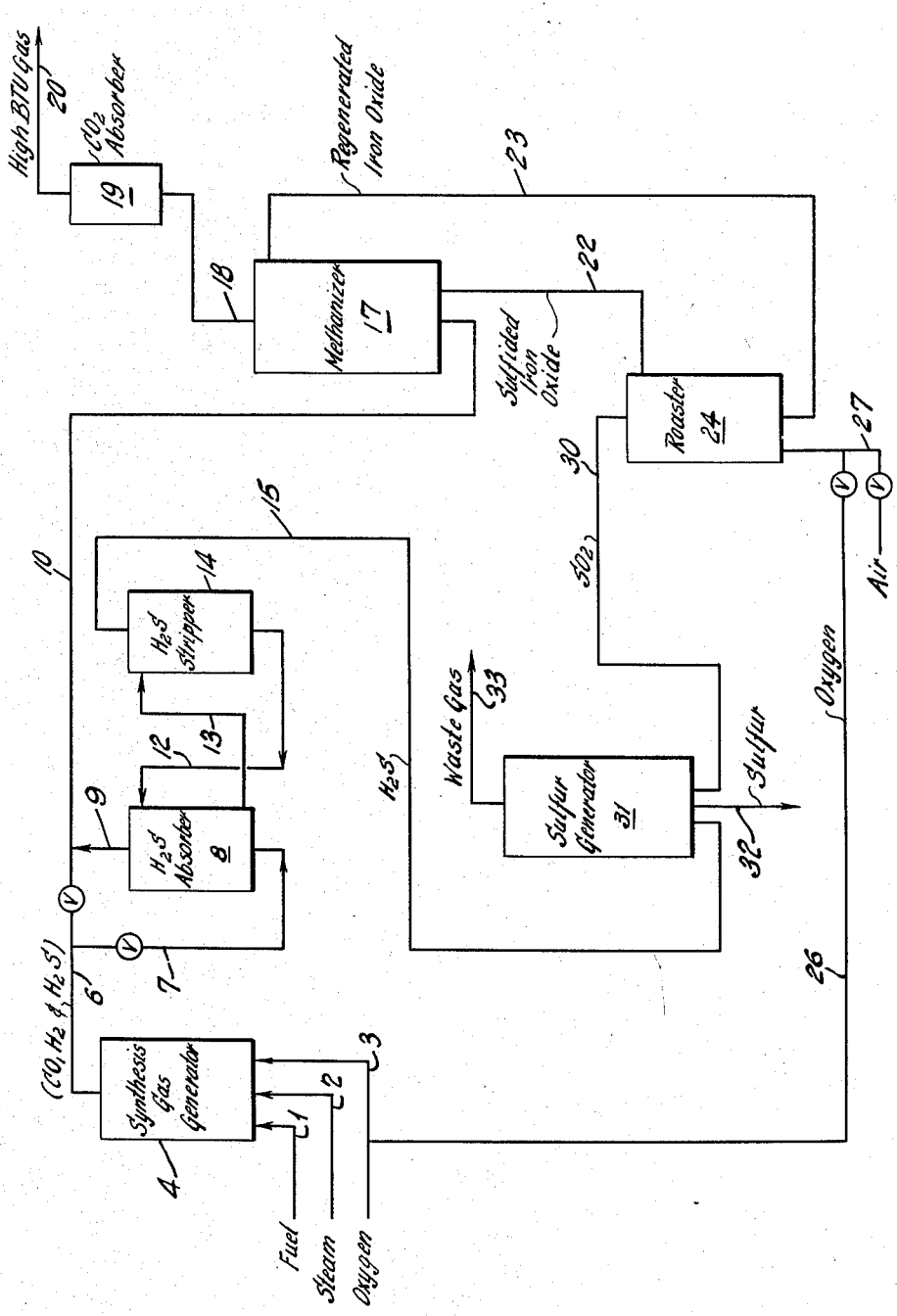

2,963,348

HYDROCARBON CONVERSION PROCESS

Frederick Burton Sellers, Tarrytown, N.Y., assignor to Texaco Development Corporation, New York, N.Y., a corporation of Delaware Filed June 7, 1957, Ser. No. 664,405

3 Claims. (Cl. 23—225)

This invention relates to a method and apparatus for the conversion of hydrocarbons. In one of its more specific aspects it is directed to the conversion of sulfur-containing carbonaceous fuels to high B.t.u. gas and elemental sulfur by reacting said fuel with oxygen to generate a synthesis gas comprising hydrogen, carbon monoxide and hydrogen sulfide. The synthesis gas so produced is treated to separate a portion of the hydrogen sulfide. The synthesis gas of reduced hydrogen sulfide content is subjected to methanization in the presence of an iron oxide catalyst. In the methanization step, hydrogen and carbon monoxide are reacted to produce methane and carbon dioxide and the hydrogen sulfide present in the feed gas is reacted with the iron oxide catalyst to produce iron sulfide. Fresh iron oxide is continuously supplied to the methanization zone and a stream of sulfided iron catalyst is continuously withdrawn to maintain high catalytic activity for the methanization reaction. Effluent gas from the methanization zone comprising methane and carbon dioxide may be subjected to treatment for the removal of carbon dioxide to produce a gas of increased B.t.u. value. Sulfided iron oxide catalyst from the methanization zone is directed to a roaster where it is roasted with an oxygen-containing gas to produce sulfur dioxide and regenerate the iron oxide catalyst. Regenerated iron oxide catalyst is recycled to the methanization zone to provide at least a part of the fresh iron oxide required therein. Sulfur dioxide from the roasting step is reacted with that portion of the hydrogen sulfide separated from the synthesis gas to produce elemental sulfur.

Heretofore, sulfur-containing fuels have been considered unsatisfactory for conversion to high B.t.u. gas by a combination of partial oxidation and methanization because of the tendency of sulfur to poison the catalyst employed in the methanization step. In the process of this invention, the problem of sulfur poisoning of the catalyst has been overcome and concomitantly the sulfur is separated as a useful product.

The process of this invention is applicable to sulfur-containing carbonaceous fuels generally. Solid fuels, for example, coke, coal of various grades, oil sand, tar sand and oil shale, liquid fuels, for example, crude oil, reduced crude, cracking plant residual oil, coal tar and shale oil, as well as gaseous sulfur-containing fuels may be subjected to partial oxidation to produce synthesis gas containing hydrogen sulfide.

In the partial oxidation synthesis gas generation step of this process, fuel is reacted with an oxygen-containing gas, preferably oxygen. Commercially pure oxygen is readily obtained by the rectification of air. Steam may be added to control the reaction temperature within a desired range of about 1,800° F. to about 3,200° F. preferably within the range of about 2,200° F. to 2,800° F. The partial oxidation of hydrocarbon fuels is described in detail in U.S. Patent 2,582,938 and the partial oxidation of solid carbonaceous fuels is described in the co-pending application of Du Bois Eastman and Leon Gaucher, Serial No. 490,214, filed February 24, 1955. The products of the partial oxidation of sulfur-containing carbonaceous fuels, hereinafter referred to as synthesis gas, comprise hydrogen, carbon monoxide and hydrogen sulfide. The ratio of hydrogen to carbon monoxide in synthesis gas so produced is usually within the range of about one to one to about three to one.

The hydrogen sulfide-containing synthesis gas is then passed to a hydrogen sulfide separation step wherein a portion of the hydrogen sulfide is separated from the synthesis gas. Hydrogen sulfide may be separated from synthesis gas by an absorption step, for example, by solvent absorption with water or with ethanolamine. According to the process of this invention, only a portion of the hydrogen sulfide in the total synthesis gas stream is removed. Obviously this may be accomplished by separating a portion of the hydrogen sulfide from the total stream or by treating only a portion of the total stream to remove the hydrogen sulfide contained therein. In any event about two thirds of the sulfur contained in the synthesis gas is separated as hydrogen sulfide and the remaining sulfur is retained in the synthesis gas.

Synthesis gas containing a reduced amount of hydrogen sulfide is then passed to a methanization reactor to effect conversion of at least a portion of the carbon monoxide and hydrogen therein to methane. Methanization is effected by contacting the reactant gases with an iron oxide catalyst at a space velocity within the range of about 250 to 4000 volumes of gas per hour per volume of catalyst, at a temperature within the range of about 600 to 1400° F. and a pressure within the range of about 50 to 500 pounds per square inch. Effluent gas from the methanizer, comprises a gas having a heating value within the range of about 450 to 1100 B.t.u. per cubic foot after separation of water vapor and carbon dioxide.

Advantageously the iron oxide catalyst is in the form of pulverulent solids which are fluidized by the gaseous reactants. However, it is within the scope of this invention to employ granular or lump iron oxide in a moving bed catalytic operation or in fixed bed operation. In the methanization reactor, carbon monoxide and hydrogen are reacted to form carbon dioxide and methane. The hydrogen sulfide present in the feed gas reacts with the iron oxide catalyst to form iron sulfide. Gaseous effluent from the methanization reactor may be treated with an absorbent for carbon dioxide to remove the carbon dioxide and produce a product gas of increased heating value. Fresh iron oxide catalyst is added to the methanization zone either continuously or from time to time as required to maintain high catalytic activity. In a fluidized catalyst system, fresh iron oxide is advantageously added continuously. The iron oxide addition rate may be regulated depending upon the sulfur content of the feed gas. In a fixed bed methanization operation, a plurality of reactors may be employed permitting processing in one reactor while other reactors are being regenerated or loaded and unloaded for catalyst regeneration.

Methanization catalyst containing iron sulfide and carbonaceous deposits is passed to a roaster. When fluidized catalyst is employed in the methanization zone, advantageously, the roaster also may employ a fluidized bed operation. In the roaster, oxygen-containing gas is passed in contact with the sulfided catalyst to convert the iron sulfide to iron oxide and sulfur dioxide and to burn the carbonaceous deposits to form carbon dioxide. The roasting step of the process of this invention is advantageously conducted at a temperature of 1000° F. to 2700° F. and at a pressure within the range of atmospheric to 600 p.s.i.g. Regenerated iron oxide substantially free of sulfur and carbonaceous deposits is withdrawn from the roasting step. The regenerated iron oxide is then returned to the methanizer to provide at least a part of the iron oxide catalyst required therein.

Effluent gas from the roaster comprising sulfur dioxide is admixed with hydrogen sulfide from the hydrogen sulfide separation step of this process to form a gas comprising about two parts of hydrogen sulfide to one part of sulfur dioxide. This mixture of gases is contacted with an activated bauxite catalyst at a temperature within the range of about 400 to 650° F. whereby the hydrogen sulfide and sulfur dioxide are reacted to form elemental sulfur and water. The elemental sulfur is then withdrawn as a product of this process.

An advantage of the process of this invention is that carbonaceous fuels containing substantial quantities of sulfur may be readily converted to high B.t.u. value heating gases.

Another advantage of this process is that sulfur is recovered in useful form in the conversion of carbonaceous fuels to heating gases.

Another advantage of the process of this invention is that it is very flexible with reference to the sulfur content of the feed and increased sulfur may be accommodated by increasing the rate of iron oxide replacement.

Another advantage of the process of this invention is that methanization of sulfur-containing gases may be effected without the detrimental effects of sulfur poisoning of iron oxide catalysts.

The accompanying drawing diagrammatically illustrates one form of the process of this invention. Although the drawing illustrates one arrangement of apparatus in which the process of this invention may be practiced, it is not intended to limit the invention to the particular apparatus or materials described.

Sulfur-containing fuel in line 1, steam in line 2 and oxygen in line 3 are passed to synthesis gas generator 4. Synthesis gas generator 4 is operated under partial combustion conditions to produce a gas comprising carbon monoxide, hydrogen and hydrogen sulfide. Effluent gas in line 6 is divided and a portion passed through line 7 to hydrogen sulfide absorber 8. In hydrogen sulfide absorber 8, the gas is contacted with an absorbent effective to dissolve hydrogen sulfide. Gas of reduced hydrogen sulfide content is withdrawn from hydrogen sulfide absorber 8 through line 9 and combined with the untreated effluent gas from line 6 and the combined stream passed through line 10. The absorption solvent is passed to hydrogen sulfide absorber 8 through line 12 and rich absorption solvent containing dissolved hydrogen sulfide is withdrawn through line 13. Rich absorption solvent is stripped in hydrogen sulfide stripper 14 to regenerate the absorbent which is returned to the absorber through line 12, and to produce a gas comprising hydrogen sulfide which is withdrawn through line 15.

Synthesis gas of reduced hydrogen sulfide content in line 10 is passed to methanizer 17. In methanizer 17, carbon monoxide and hydrogen are contacted with an iron oxide catalyst to form methane and carbon dioxide which is withdrawn as gaseous effluent through line 18. Gaseous effluent from the methanizer is passed to carbon dioxide absorber 19 for removal of the carbon dioxide and production of a high B.t.u. gas which is discharged through line 20. In the process of methanization the iron oxide catalyst also reacts with the hydrogen sulfide present in the feed gas to form iron sulfide. Since the iron sulfide is not highly active in promoting the methanization reaction, it is continuously withdrawn from the methanizer through line 22 and fresh iron oxide is added through line 23. Sulfided iron oxide is passed through line 22 to roaster 24.

The sulfided iron oxide in roaster 24 is contacted with oxygen from line 26, or in the alternative, with air from line 27 to convert the iron sulfide present to iron oxide. Any carbonaceous deposit on the catalyst is converted to carbon dioxide and water vapor. Regenerated iron oxide is then withdrawn from the roaster through line 23 and is returned to the methanizer 17. Effluent gas from roaster 24 comprises sulfur dioxide which is passed through line 30 to sulfur generator 31. Hydrogen sulfide gas from line 15 is contacted with the sulfur dioxide-containing gas in sulfur generator 31 to produce elemental sulfur which is withdrawn in liquid form through line 32 and waste gas which is discharged through line 33.

As described hereinbefore, the ratio of hydrogen to carbon monoxide in the raw synthesis gas produced according to the process of this invention varies according to the feed stock and the amount of steam or carbon dioxide included in the feed to the synthesis gas generator. The ratio of hydrogen to carbon monoxide is of relatively little importance on the course of the methanization reaction of this process since the reaction will proceed until that component is exhausted which is in stoichiometric deficiency at the prevailing equilibrium conditions (either hydrogen or carbon monoxide). However, an excess of hydrogen or carbon monoxide effects the heating value of the gas produced since the component in excess is unconverted and appears in the product gas as a diluent having only about one-third the heating value of the methane produced. When methanizing gases having a hydrogen to carbon monoxide ratio within the range of about one to one to about three to one according to the process of this invention, dry gases are produced having higher heating values within the range of about 380 to 500 B.t.u. per cubic foot before removal of carbon dioxide and within the range of about 450 to 1100 B.t.u. per cubic foot after removal of carbon dioxide.

*Example*

In an example of the process of this invention, a sulfur-containing oil is reacted with 95 percent purity oxygen. The oil charge is characterized by a gravity of 3.1° API, a sulfur content of 5.6 weight percent and a carbon residue of 18.0 weight percent. In the synthesis gas generator, 27,297 pounds per hour of oil and 13,649 pounds per hour of steam preheated to 750° F. are reacted with 26,000 pounds per hour of oxygen preheated to 300° F. The reaction is effected at a temperature of 2500° F. and a pressure of 500 pounds per square inch gauge. Synthesis gas at a rate of 1,423,000 standard cubic feet per hour is produced of the following composition:

| | Mol percent | | Mol percent |
|---|---|---|---|
| $CO$ | 41.7 | $CH_4$ | 0.2 |
| $H_2$ | 40.2 | $A+N_2$ | 1.3 |
| $CO_2$ | 4.5 | $H_2S+COS$ | 1.1 |
| $H_2O$ | 11.0 | | |

After condensation of water, about 846,000 standard cubic feet per hour of gas are withdrawn and contacted with an ethanolamine solution for the removal of hydrogen sulfide. The resultant gas essentially free of hydrogene sulfide is recombined with the remaining synthesis gas to produce a stream of reduced hydrogen sulfide content comprising 1,213,000 standard cubic feet per hour of synthesis gas containing 0.4 volume percent hydrogen sulfide. A gas stream comprising 11,000 standard cubic feet per hour of hydrogen sulfide and 42,000 standard cubic feet per hour of carbon dioxide is stripped from the ethanolamine solution. The synthesis gas of reduced hydrogen sulfide content is passed to a methanizer at a temperature of about 1250° F. and at a pressure of about 400 pounds per square inch gauge wherein it is contacted with a fluidized bed of iron oxide catalyst. Effluent gas from the methanizer comprises about 750,000 standard cubic feet per hour of gas having a higher heating value of 408 B.t.u. per cubic foot and a composition of 18.4 mol percent carbon monoxide, 15.5 percent hydrogen, 33.0 percent carbon dioxide, 30.6 percent methane and 2.5 percent argon and nitrogen. This gas is passed through a carbon dioxide absorption system wherein it is contacted with an ethanolamine solution to produce a final high B.t.u. gas comprising 517,000 standard cubic feet per hour of gas having a higher heating value of 609 B.t.u. per cubic foot and the following composition:

| | Mol percent | | Mol percent |
|---|---|---|---|
| CO | 26.9 | $CH_4$ | 44.5 |
| $H_2$ | 22.5 | $A+N_2$ | 3.7 |
| $CO_2$ | 2.4 | | |

Activity of the catalyst in the methanization step is maintained by continuously adding about 4,828 pounds per hour of fresh iron oxide catalyst. Sulfided catalyst at a rate of 5.040 pounds per hour is withdrawn from the methanizer and passed to a roaster. In the roaster the sulfided catalyst is reacted with 9,300 standard cubic feet per hour of oxygen to produce 5,300 cubic feet per hour of sulfur dioxide and regenerated iron oxide catalyst.

This amount of sulfur dioxide is reacted with the 11,000 cubic feet per hour of hydrogen sulfide from the synthesis gas scrubbing step by contacting with activated bauxite at a temperature of 475° F. and at substantially atmospheric pressure. Liquid sulfur at a rate of 1,376 pounds per hour is withdrawn from the sulfur generator to storage. Waste gas from the sulfur generator comprising nitrogen, carbon dioxide and water vapor is discharged to disposal facilities.

Obviously, many modifications and variations of the invention as hereinbefore set forth may be made without departing from the spirit and scope thereof and only such limitations should be imposed as are indicated in the appended claims.

I claim:

1. A process for the concomitant production of high B.t.u. fuel gas and sulfur from a sulfur-containing carbonaceous fuel which comprises reacting said sulfur-containing carbonaceous fuel with an oxygen-containing gas in a stoichiometric proportion such that said fuel is substantially completely converted into hydrogen, carbon monoxide, and hydrogen sulfide, separating a gas stream comprising about two thirds of said hydrogen sulfide and substantially free of carbon monoxide and hydrogen, contacting a gas stream comprising said hydrogen, said carbon monoxide, and the remaining one-third of unseparated hydrogen sulfide with a methanization catalyst consisting essentially of iron oxide in a methanization zone to effect reaction of said hydrogen and said carbon monoxide to form a raw product gas comprising methane and carbon dioxide and to effect reaction of said unseparated hydrogen sulfide with a portion of said iron oxide to form iron sulfide, withdrawing said raw product gas, withdrawing at least a portion of the iron sulfide-containing catalyst and contacting said iron sulfide-containing catalyst with an oxygen-containing-gas to regenerate iron oxide catalyst and to form a gas comprising sulfur dioxide, withdrawing said regenerated iron oxide catalyst and returning said regenerated catalyst to said methanization zone, reacting said separated hydrogen sulfide and said gas comprising sulfur dioxide to form elemental sulfur, and separating said elemental sulfur.

2. A process for the concomitant production of high B.t.u. fuel gas and sulfur from a sulfur-containing carbonaceous fuel which comprises reacting said sulfur-containing carbonaceous fuel at a temperature within the range of about 1,800° F. to about 3,200° F. with a gas comprising about 95 percent oxygen in a stoichiometric proportion such that said fuel is substantially completely converted into hydrogen, carbon monoxide, and hydrogen sulfide, separating a gas stream comprising about two-thirds of said hydrogen sulfide and substantially free of carbon monoxide and hydrogen, contacting a gas stream comprising said hydrogen, said carbon monoxide, and the remaining one third of unseparated hydrogen sulfide with a methanization catalyst consisting essentially of iron oxide in a methanization zone at a temperature within the range of about 600° F. to about 1,400° F. to effect reaction of said hydrogen and said carbon monoxide to form a raw product gas comprising methane and carbon dioxide and to effect reaction of said unseparated hydrogen sulfide with at least a portion of said iron oxide to form iron sulfide, withdrawing said raw product gas, withdrawing at least a portion of said iron sulfide-containing catalyst and contacting said iron sulfide-containing catalyst with an oxygen-containing gas at a temperature within the range of about 1,000° F. to about 2,700° F. to regenerate iron oxide catalyst and to form a gas comprising sulfur dioxide, withdrawing said regenerated iron oxide catalyst and returning said regenerated catalyst to said methanization zone, reacting said separated hydrogen sulfide and said gas comprising sulfur dioxide at a temperature within the range of about 400° F. to about 650° F. in the presence of a bauxite catalyst to form elemental sulfur, and separating said elemental sulfur.

3. A process for the concomitant production of high B.t.u. fuel gas and sulfur from a sulfur-containing carbonaceous fuel which comprises reacting said sulfur-containing carbonaceous fuel with an oxygen-containing gas in a stoichiometric proportion such that said fuel is substantially completely converted into hydrogen, carbon monoxide, and hydrogen sulfide, separating a gas stream comprising about two thirds of said hydrogen sulfide and substantially free of carbon monoxide and hydrogen, contacting a gas stream comprising said hydrogen, said carbon monoxide, and the remaining one third of unseparated hydrogen sulfide with a methanization catalyst consisting essentially of iron oxide in a methanization zone to effect reaction of said hydrogen and said carbon monoxide to form a raw product gas comprising methane and carbon dioxide and to effect reaction of said unseparated hydrogen sulfide with a portion of said iron oxide to form iron sulfide, withdrawing said raw product gas, separating at least a portion of said carbon dioxide from said raw product gas to produce a heating gas having a calorific value within the range of about 450 to about 1,100 B.t.u.'s per cubic foot, withdrawing at least a portion of the iron sulfide-containing catalyst and contacting said iron sulfide-containing catalyst with an oxygen-containing-gas to regenerate iron oxide catalyst and to form a gas comprising sulfur dioxide, withdrawing said regenerated iron oxide catalyst and returning said regenerated catalyst to said methanization zone, reacting said separated hydrogen sulfide and said gas comprising sulfur dioxide to form elemental sulfur, and separating said elemental sulfur.

References Cited in the file of this patent

UNITED STATES PATENTS

| 1,849,526 | Hultman | Mar. 15, 1932 |
| 2,074,311 | Moore | Mar. 16, 1937 |
| 2,384,926 | Jones | Sept. 18, 1945 |
| 2,619,407 | Udy | Nov. 25, 1952 |
| 2,785,056 | Thumm et al. | Mar. 12, 1957 |

FOREIGN PATENTS

| 163.607 | Australia | June 27, 1955 |
| 640,907 | Great Britain | Aug. 2, 1950 |

UNITED STATES PATENT OFFICE

CERTIFICATION OF CORRECTION

Patent No. 2,963,348                        December 6, 1960

Frederick Burton Sellers

It is hereby certified that error appears in the above numbered patent requiring correction and that the said Letters Patent should read as corrected below.

Column 4, lines 56 and 57, for "hydrogene" read -- hydrogen --; column 5, line 14, for "5.040" read -- 5,040 --.

Signed and sealed this 2nd day of May 1961.

(SEAL)
Attest:

ERNEST W. SWIDER
Attesting Officer

DAVID L. LADD
Commissioner of Patents